3,499,888
3-AZABICYCLO[3.2.2]NONANE-3-ETHYL
BENZILATE
Jack Bernstein, New Brunswick, N.J., assignor, by mesne assignments, to E. R. Squibb & Sons, Inc., New York, N.Y., a corporation of Delaware
No Drawing. Continuation-in-part of application Ser. No. 251,763, Jan. 16, 1963. This application July 12, 1965, Ser. No. 471,386
Int. Cl. C07d 41/04
U.S. Cl. 260—239          1 Claim

ABSTRACT OF THE DISCLOSURE

This invention relates to novel esters of 3-aza-bicyclo[3.2.2]nonane of the general formula

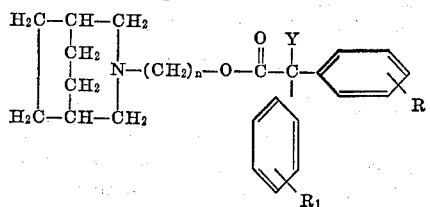

and salts thereof, which have antihistaminic and antispasmodic properties.

---

This application is a continuation-in-part of application Ser. No. 251,763, filed Jan. 16, 1963, now U.S. Patent 3,265,683.

This invention relates to novel basic esters of 3-azabicyclo[3.2.2]nonane. More particularly, the invention relates to novel esters of 3-azabicyclo[3.2.2]nonane of the formula (I) 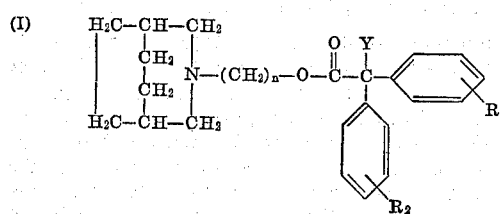

and to acid-addition and quaternary ammonium salts thereof.

Y in the above formula represents halogen, hydroxy and alkoxy. R and $R_1$ each represents hydrogen, alkyl, trihalomethyl and alkoxy. The symbol $n$ represents 2, 3, or 4.

The alkyl groups included in R and $R_1$ are preferably straight or branched chain lower alkyl groups such as methyl, ethyl, propyl, isopropyl, butyl, isobutyl, t-butyl, amyl, hexyl and the like. The alkoxy groups represented by R, $R_1$ and Y are preferably straight or branched chain lower alkoxy groups such as methoxy, ethoxy, propoxy, isopropoxy, butoxy and the like.

All four halogens are contemplated within the meaning of the symbols Y, R and $R_1$, but chlorine and bromine are preferred. In the case of trihalomethyl, trifluoromethyl is preferred.

The compounds of Formula I may be produced by reacting a 3-azabicyclo[3.2.2]nonane-3-alkanol (i.e., wherein $R_4$ in Formula II below represents OH), with a substituted diphenyl acetyl halide. This reaction is carried out in an inert, moderately high boiling hydrocarbon solvent, e.g., an aromatic hydrocarbon such as toluene, preferably with heating. If an α-halogenated diphenyl acetyl halide is used as one reactant, then a compound of Formula III results wherein $R_3$ is halogen. This compound may then be hydrolyzed in aqueous solution to produce the compound of Formula IV wherein $R_2$ is hydrogen. Similar treatment with an alcohol yields compounds of Formula IV wherein $R_2$ represents alkyl. Heating accelerates the hydrolysis or alcoholysis reactions.

These reactions may be represented by the following flow diagrams.

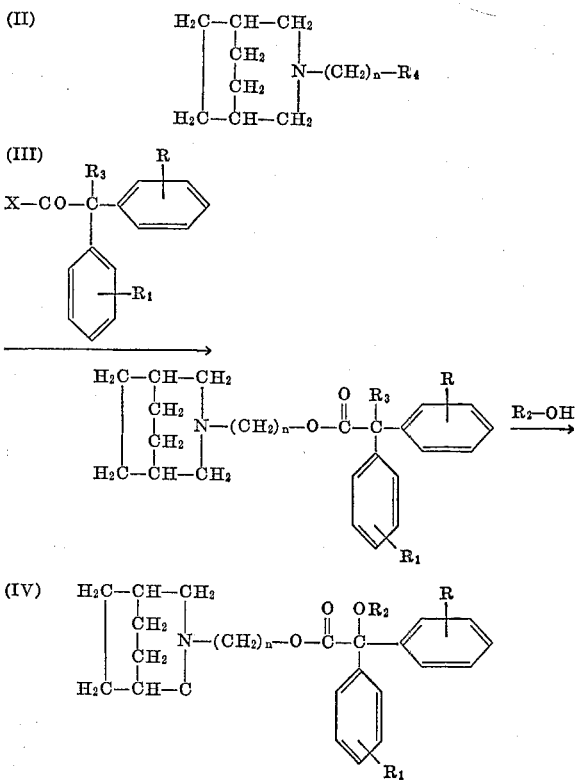

The symbols $n$, R and $R_1$ have the same meaning as defined previously. X represents halogen, $R_2$ represents hydrogen or lower alkyl, and $R_3$ represents halogen, and $R_4$ represents hydroxy.

The starting material of Formula II, when $R_4$ represents OH and $n$ is 2 or 3 is prepared by reacting 3-azabicyclo[3.2.2]-nonane, preferably with heating in an organic solvent such as toluene, with a haloalkanol such as 2-chloroethanol, 2-bromopropanol, or 3-bromopropanol or by reaction with ethylene oxide ($n=2$). When $R_4$ represents OH and $n$ is greater than 2, the starting material of Formula II is preferably prepared by reacting 3-azabicyclo[3.2.2]nonane with the monoester acyl chloride of a dibasic acid, such as monoethyl malonate chloride or monoethyl succinate chloride and submitting the monoamide monoester thus formed to the action of lithium aluminum hydride in an inert solvent such as ether or tetrahydrofuran.

The novel basic esters of Formula I form acid-addition salts by reaction with the common organic and inorganic acids. The salts include, for example, the hydrohalides, e.g., hydrochloride, hydrobromide, hydroiodide, phosphates, nitrate, sulfate, acetate, oxalate, tartrate, malate, citrate, camphorsulfonate, benzoate, salicylate, ascorbate, alkanesulfonate, e.g., methanesulfonate, arylsulfonate, e.g., benzenesulfonate, toluenesulfonate and the like. It is frequently convenient to effect the isolation of the compound in the form of its acid-addition salt. The free base may then be released by reaction with a base, e.g., aqueous sodium hydroxide.

These esters also form quaternary ammonium salts, for example, with lower alkyl halides such as methyl chloride, methyl bromide, ethyl chloride, ethyl bromide, ethyl iodide and the like, lower alkyl sulfates such as methyl sulfate, ethyl sulfate and the like, aralkyl halides such as benzyl chloride, phenethyl bromide and the like.

All such salts are within the scope of this invention.

The new compounds of this invention are useful as antihistamines and antispasmodic agents. They may be administered orally or parenterally by incorporating the appropriate dosage of the basic ester or a physiologically acceptable acid-addition salt or quaternary ammonium salt thereof together with conventional carriers or excipients in a tablet, capsule, elixir, injectable or the like according to accepted pharmaceutical practice.

The following examples are illustrative of the invention. All temperatures are in degrees centigrade.

EXAMPLE 1

Benzilic acid, ester with 3-azabicyclo[3.2.2]nonane-3-ethanol hydrochloride (a) Preparation of 3-azabicyclo[3.2.2]nonane-3-ethanol.—A solution of 8.0 g. (0.1 moles) of freshly distilled 2-chloroethanol in 50 ml. of dry toluene is added to a solution of 25.0 g. (0.2 moles) of 3-azabicyclo[3.2.2]nonane in 100 ml. of dry toluene. After warming to reflux with stirring for 6 hours and cooling to room temperature, the solid precipitate of 3-azabicyclo[3.2.2]nonane hydrochloride is removed by filtering under suction with a recovery of 15.5 g. (96% of theory). The filtrate is extracted with 135 ml. of 2½% aqueous hydrogen chloride from which the free base is released with 5% sodium hydroxide and taken up in ether. After drying over magnesium sulfate, filtration and removal of the solvent, the residue of crude product is purified by distillation under reduced pressure to give a yield of 14.0 g. (82% of theory) distilling at 76°–78° at 0.1–0.2 mm. The product solidifies readily when stored below room temperature.

(b) Preparation of benzilic acid, ester with 3-azabicyclo[3.2.2]nonane-3-ethanol hydrochloride.—A solution of 12.6 g. (0.075 moles) of 3-azabicyclo[3.2.2]nonane-3-ethanol in 100 ml. of anhydrous benzene is added at room temperature over a period of 15 minutes with stirring to a solution of 20.0 g. (0.075 moles) of α-chlorodiphenylacetyl chloride in 100 ml. of benzene. The reaction temperature increased spontaneously to 35°. After stirring 30 minutes at room temperature and at reflux temperature for 3 hours, the solvent is removed by distillation and the solid residue is triturated with ether, filtered and dried over $P_2O_5$ in a vacuum desiccator giving a yield of 28.5 g. (76% of theory) of α-chlorodiphenylacetic acid, ester with 3-azabicyclo[3.2.2]nonane-3-ethanol, hydrochloride with a melting point of 172–174° (when recrystallized from toluene).

A suspension of 25.0 g. (0.058 moles) of the above crude product (M.P. 155° d.) in 300 ml. of water is warmed at 85–90° for 30 minutes with stirring during which time partial solution occurs, followed by crystallization of solid from the hot solution. After cooling in an ice-water bath for 30 minutes, 20.0 g. (83% of theory) of product is recovered by filtration under suction with a melting point of 200–202°. Recrystallization from 500 ml. boiling water gives a yield of 13.0 g. (54% of theory) with a melting point of 200–202° dec.

EXAMPLE 2

4,4′-dichlorobenzilic acid, ester with 3-azabicyclo[3.2.2]nonane-3-ethanol hydrochloride (a) Preparation of 2-chloro - 2,2 - bis(p-chlorophenyl) acetic acid, ester with 3-azabicyclo[3.2.2]nonane-3-ethanol hydrochloride.—A solution of 16 g. (0.05 moles) of 2,2-bis(p-chlorophenyl)-2-chloroacetyl chloride in 200 ml. anhydrous toluene is added dropwise at a reaction temperature of 27° to a stirred solution of 8.3 g. (0.05 moles) of 3-azabicyclo[3.2.2]nonane-3-ethanol in 75 ml. of anhydrous toluene. After stirring for 90 minutes following the addition at room temperature, the reaction mixture is stirred at 85–90° for an additional 2½ hours, cooled to 25° and 600 ml. of anhydrous ether are added. After standing overnight, the reaction mixture is filtered under suction, washed with ether and dried to give a yield of 18 g. (75% of theory) with a melting point of 180–185°. The crude product is used without further purification for the following reaction. A sample recrystallized from methyl ethyl ketone has a melting point of 186–188° (dec.).

(b) Preparation of 4,4′-dichlorobenzilic acid, ester with 3-azabicyclo[3.2.2]nonane - 3 - ethanol hydrochloride.—A suspension of 8 g. (0.015 moles) of 2-chloro-2,2-bis(p-chlorophenyl)acetic acid, ester with 3-azabicyclo[3.2.2]nonane-3-ethanol, hydrochloride in 250 ml. of water is warmed with stirring at 85–90° for 45 minutes. After cooling to room temperature, 8 g. of air dried white solid is recovered by filtration under suction, melting at 208–210° (dec.). It is purified to a constant melting point of 210–212° (dec.) by recrystallization from acetonitrile with a recovery of 5.5 g. (75% of theory).

EXAMPLE 3

2-ethoxy-2,2-diphenylacetic acid, ester with 3-azabicyclo[3.2.2]nonane-3-ethanol hydrochloride A solution of 8 g. (0.018 moles) of 2-chloro-2,2-diphenylacetic acid, ester with 3-azabicyclo[3.2.2]nonane-3-ethanol in 200 ml. absolute ethanol is warmed to reflux for 2 hours, after which time the excess ethanol is removed by distillation leaving a viscous oil residue which solidifies on cooling and trituration with ether. The crude product, weighing 8 g. and melting at 150–160° (dec.) is purified to a constant melting point of 172–174° (dec.) by recrystallization from isopropanol with a recovery of 4.5 g. (55% of theory.)

EXAMPLE 4

2,2-bis-(p-tolyl)acetic acid, ester with 4-(3-azabicyclo[3.2.2]nonan-3-yl)-1-butanol hydrochloride (a) Preparation of 4-(3-azabicyclo[3.2.2]nonan-3-yl)-4-ketobutyric acid, ethyl ester.—A solution of 75 grams of 3-azabicyclo[3.2.2]nonane in 150 ml. of anhydrous ether is added dropwise, with vigorous stirring, to a solution of 49.2 grams of monoethyl succinate chloride in 150 ml. of anhydrous ether. During the addition, the reaction mixture is cooled in an ice bath. After the addition is completed, the reaction mixture is allowed to warm to room temperature and is stirred for an additional hour. Three hundred ml. of ice water are added to the reaction mixture and the ether layer separated. It is dried over magnesium sulfate and then concentrated to yield 4-(3-azabicyclo[3.2.2]nonan-3-yl)-4-ketobutyric acid, ethyl ester. The ester may be purified by distillation under reduced pressure, but is normally reduced without further purification.

(b) Preparation of 4-(3-azabicyclo[3.2.2]nonan-3-yl)-1-butanol.—A solution of 25 grams of 4-(3-azabicyclo[3.2.2]nonan-3-yl)-4-ketobutyric acid, ethyl ester, in 200 ml. of anhydrous ether is added slowly, with vigorous stirring, to a suspension of 12 grams of lithium aluminum hydride in 450 ml. of anhydrous ether. The rate of addition is regulated to cause gentle refluxing of the ether. The reaction mixture is allowed to stand for 18 hours at room temperature after the addition is completed. Ice water is then added slowly with cooling. The aqueous layer is acidified and the layers separated. The aqueous layer is made strongly alkaline with 50% sodium hydroxide solution and extracted several times with ether. The combined ether solutions are dried over magnesium sulfate and concentrated to leave a residual oil. The oil is purified by distillation under reduced pressure.

(c) Preparation of 2,2-bis-(p-tolyl)acetic acid, ester with 4-(3-azabicyclo[3.2.2]nonan-3-yl)-1-butanol hydrochloride.—A solution of 19.7 grams of 4-(3-azabicyclo [3.2.2]nonan-3-yl)-1-butanol in 200 ml. of anhydrous benzene is added with stirring at room temperature over a period of 15 minutes to a solution of 26 grams of 2,2-bis (p-tolyl)acetyl chloride in 150 ml. of anhydrous benzene. The reaction mixture is stirred for 30 minutes at room temperature and then heated under reflux for 3 hours. The solvent is removed by distillation and the residue triturated with anhydrous ether. The solid is removed by filtration and dried over phosphorous pentoxide in a vacuum desiccator to yield the desired product.

What is claimed is:

1. Benzilic acid, ester with 3-azabicyclo[3.2.2]nonane-3-ethanol.

References Cited
UNITED STATES PATENTS

| | | | |
|---|---|---|---|
| 2,735,847 | 2/1956 | Blicke | 260—239 |
| 2,953,565 | 9/1960 | Faust et al. | 260—473 |
| 2,987,517 | 6/1961 | Martin et al. | 260—473 |
| 3,173,909 | 3/1965 | Brown et al. | 260—239 |

ALTON D. ROLLINS, Primary Examiner

U.S. Cl. X.R.

260—999